United States Patent [19]

O'Connell

[11] Patent Number: 4,996,260

[45] Date of Patent: Feb. 26, 1991

[54] COMPOSITIONS OF NON-FILM FORMING POLYSULFIDE, LATEX EMULSION AND HYDROCARBON RESIN

[75] Inventor: Daniel O'Connell, Crystal Lake, Ill.

[73] Assignee: Morton International, Inc., Chicago, Ill.

[21] Appl. No.: 447,281

[22] Filed: Dec. 7, 1989

[51] Int. Cl.$^5$ .............................................. C08K 5/05
[52] U.S. Cl. ................................... 524/381; 524/499; 524/508
[58] Field of Search ............... 524/381, 499, 392, 508

[56] References Cited

U.S. PATENT DOCUMENTS

| | | | |
|---|---|---|---|
| 3,770,678 | 11/1973 | Paul | 524/392 |
| 4,301,050 | 11/1981 | Masuda et al. | 524/499 |
| 4,477,613 | 10/1984 | Evans et al. | 524/270 |
| 4,670,504 | 6/1987 | Cardenas et al. | 524/504 |

*Primary Examiner*—Joseph L. Schofer
*Assistant Examiner*—Mark D. Sweet
*Attorney, Agent, or Firm*—Wayne E. Nacker; Gerald K. White

[57] ABSTRACT

Compositions, such as caulks, paints, sealants and water barriers have a binder which comprises emulsified and/or dispersed (A) film forming latex, (B) non-forming liquid polysulfide and (C) hydrocarbon resin.

8 Claims, No Drawings

COMPOSITIONS OF NON-FILM FORMING POLYSULFIDE, LATEX EMULSION AND HYDROCARBON RESIN

The present invention is directed to compositions such as caulks, paints, coatings, sealants and water barriers in which the binder system is based upon a liquid polysulfide and where a hydrocarbon resin is included in the binder system for modification of the final properties of the composition.

BACKGROUND OF THE INVENTION

Emulsion/dispersion compositions of non-film forming liquid polysulfides are known. In such systems, a binder comprises an aqueous emulsion of a film-forming polymeric material plus dispersed, non-film forming liquid polysulfide. Such compositions also include various amounts of fillers or pigments, according to their intended end use. Those compositions have found widespread use in various coating and sealing applications, including caulks, paints, coatings, sealants and water barriers.

In accordance with the present invention, it is a general object to enhance physical properties, particularly elongation, of polysulfide-based emulsion/dispersion compositions.

BRIEF DESCRIPTION OF THE INVENTION

In accordance with the invention, there is provided a composition which comprises an aqueous emulsion/dispersion of binder solids, the binder solids comprising (A) from between about 10 and 70 wt. percent of a film-forming latex emulsion, (B) between about 10 and about 70 wt. percent of dispersed, liquid, non-film forming polysulfide and (C) between about 10 and about 50 wt. percent emulsified hydrocarbon resin. The composition contains sufficient levels of surfactant to maintain the components of the binder system emulsified and/or suspended. The composition also contains an amount of fillers and/or pigments appropriate to the intended end-use of the composition.

DETAILED DESCRIPTION OF CERTAIN PREFERRED EMBODIMENTS

In accordance with one aspect of the invention, it is found that polysulfide-based compositions of the type in which the binder system includes emulsified film-forming polymeric latex, plus dispersed liquid polysulfide in an aqueous medium, both enhanced adhesion and, particularly, enhanced cohesion are achieved through the inclusion of hydrocarbon resin. The enhanced cohesion is a corollary of very significant elongation properties of such compositions containing the hydrocarbon resin. This finding is unexpected, as hydrocarbon resins, though known to provide hardness and water resistance, are not known to enhance elongation. Contrary to what is generally known of hydrocarbon resins, when used in conjunction with polysulfides and a film-forming resin, hydrocarbon resins substantially enhance elongation, but do not have significant effects with respect to hardness and water resistance of the end-use composition.

The film-forming emulsion may be selected from a variety of polymeric materials known in the art, including, but not limited to acrylic latex, styrene/butadiene, ethylene vinyl acetate, vinyl acetate, vinyl chloride, vinylidene chloride, vinyl acrylics and natural latex. Generally, the particle size of the emulsified film-forming polymeric material is between about 0.1 and about 0.5 micron. Of the binder solids, the film-forming emulsified polymer is used at a level of between about 10 and about 70 wt. percent and preferably between about 30 and about 55 wt. percent. Upon evaporation of water from compositions containing the emulsified film-forming polymer, the polymer particles coalesce with themselves and other components of the composition to form the film that holds the end-use composition together.

The liquid polysulfide is a non-film forming substance that is used to provide water resistance and chemical resistance to the end-use composition. The liquid polysulfide used in the emulsion/dispersion aqueous compositions of the present invention are hydroxyl-terminated and therefor are not curable with the oxidative curatives commonly used to cure —SH—terminated polysulfides. The liquid polysulfides used in the emulsion/dispersion compositions are high molecular weight polymers, having molecular weights in the 100,000–300,000 (number average) range, preferably in the range of about 200,000. In an aqueous solution, the particle size of the polysulfide dispersion is typically in the range of 8–17 microns. By the term "non-film forming polysulfides," therefore, it is meant herein to include —OH—terminated polysulfides which are not cured in the conventional manner by curatives which form disulfide linkages between —SH—terminated polysulfides. Such non-curing polysulfides are those which are originally formed in the synthesis of polysulfides. "Curable" polysulfides obtain their —SH termini through fragmentation of the larger polysulfide molecules which are originally formed.

Hydrocarbon resins used in accordance with the invention are low molecular weight polymers (oligomers) produced from by-product hydrocarbon, petroleum or coal tar streams. Polymerization of same is carried out using any one of a number of acid catalysts or as a free radical reaction using heat and pressure. Molecular weights range from about 200 up to about 1500 and includes both natural and synthetic types; aliphatic and aromatic.

Preferred hydrocarbon resins in accordance with the invention are described, for example, in U.S. Pat. No. 3,799,913 to Wheeler et al., the teachings of which are incorporated by reference. Principal polymerizable monomers from which the resins are produced include alpha-methyl styrene, indene and vinyl toluene. Additional copolymerizable monomers include, but are not limited to styrene, 3-methylindene, coumarone, divinyl benzene, ethyl styrene and beta-methyl styrene. Hydrocarbon resins used in accordance with the invention preferably have Ring and Ball Softening points of between about 60° C. and 150° C.; molecular weights (number average) of between about 350 and about 1200 and iodine numbers of between about 10 and about 70.

Hydrocarbon resins are emulsified in an aqueous medium using an appropriate surfactant. Preferred surfactants are non-ionic nonyl phenols, and it is found best to use a mixture of such surfactants of varying degree of hydrophilicity. Generally, up to about 20 wt. percent of surfactant are required relative to the weight of hydrocarbon resin. The surfactant in the final composition will typically comprise between about 0.5 and about 2.5 wt. percent relative to the binder solids.

Hydrocarbon resins are solids at room temperature, typically having melting points in the range of about 110° C. They are typically provided in flaked form. One method of emulsifying the hydrocarbon resin is to melt the resin and mix it with surfactant in its molten state and then emulsify it in aqueous solution. Another method is to first dissolve the hydrocarbon resin in a suitable solvent, such as mineral spirits, and then emulsify this solution in an aqueous medium using appropriate surfactants. Typically, the solution of hydrocarbon resin-in-solvent will be about 70 percent solids. In many applications, it is preferred to emulsify the resin-solvent system. First of all, this method is easier and requires no heat. Also, the composition that results may have improved flow characteristics due to the presence of solvent. The solvent may also provide the final composition with longer tooling time.

In emulsifying the hydrocarbon resin, it is preferred that the aqueous medium be alkaline, i.e., have a pH in the range of between about 8 and about 11, and preferably in the range of 9-9.5. The pH of the aqueous medium may be adjusted, for example, with 2.5 percent KOH solution. Initial emulsification of the hydrocarbon resin requires between about 50 and 100 wt. percent of water relative to the hydrocarbon resin. Enough water is required to effect a phase change which emulsifies the resin.

The composition, depending upon its end use, generally contains fillers or pigments, including both colored pigments and extender pigments. Typically, the pigment-to-binder ratio of the composition is between about 0.5 and about 3.

The amount of pigments used will depend upon the application. A paint (coating) or a composition for forming a film water barrier will generally have a lower amount of pigments; a caulk higher amounts of pigments. Also, the total amount of solids relative to water will vary according to the end use of the composition. A paint (coating) will typically have between about 50 and 60 wt. percent solids and between about 30 and about 40 wt. percent water. A caulk may have 70 to 85 percent solids and a water content as low as about 15 percent.

The compositions may also contain a variety of additional ingredients as are known in the art, such as antifoam agents, biocides, thickeners, etc.

The invention will now be described in greater detail by way of specific examples:

EXAMPLE 1

Paint (coating) compositions A and B were prepared, which compositions are identical except that paint A uses as the acrylic resin film-former Union Carbide 123 (60 percent non-volatile) and paint B uses as the acrylic resin film former Union Carbide 163 (58 percent non-volatile). In each case, the binder ratio is 25 percent hydrocarbon resin, 37.5 percent acrylic resin and 37.5 percent liquid polysulfide.

A hydrocarbon resin emulsion was first prepared containing:

| Composition | A Parts By Wt. | B Approx. % By Wt. |
|---|---|---|
| Nevex 100 (70% in mineral spirits) (the hydrocarbon resin) | 62.5 | 12.5 |
| Igepal CO630 (a more hydrophilic nonyl phenol surfactant) | 4.5 | 0.9 |
| Trycol NP6 (a less hydrophilic nonyl phenol surfactant) | 9 | 1.8 |
| Foamaster VL (an antifoaming agent) | 1 | 0.2 |

-continued

| Composition | A Parts By Wt. | B Approx. % By Wt. |
|---|---|---|
| Water | 55 | 10.9 |
| Troysan 174 (a preservative) | 1 | 0.2 |
| KOH 2.5% Solution in Water, pH Buffer | 12.5 | 2.5 |

A filler dispersion was prepared containing:

| | | |
|---|---|---|
| Ethylene glycol (for freeze/thaw stability) | 12.5 | 2.5 |
| Potassium tripolyphosphate (KTPP) (promotes dispersion of solids) | 0.5 | 0.1 |
| TiO$_2$ (Titanium Dioxide; Pigment) | 15 | 3.0 |
| CaCO$_3$ (Calcium Carbonate; Extender Pigment) | 85 | 17.0 |
| Acrylate thickener (50%) | 5 | 1.0 |

The two dispersions were then admixed with the following:

| | | |
|---|---|---|
| Foamaster VL | 1 | 0.2 |
| Acrylic resin emulsion | 110 | 22.0 |
| ZW 2028 (52% polysulfide dispersion | 126.2 | 25.2 |
| Total Parts By Weight | 500.7 | 100.0 |

Paint A had a pH of 8.8; paint B 8.3.

Paints (coatings) A and B were applied as a 20 mil (dry) film on a polyethylene sheet and cured for two weeks at room temperature and then stripped from the polyethylene sheet for testing purposes. The physical properties are as follows:

| | A | B |
|---|---|---|
| Hardness, Shore A | 38 | 45 |
| Tensile, PSI | 137.2 | 107.7 |
| Elongation % | 691.4 | 519.6 |
| C-tear lbs/in | 44.27 | 48.06 |

COMPARATIVE EXAMPLE 1A

Control formulations similar to Compositions A and B of Example 1 were prepared without hydrocarbon resin as controls. These paints, A' and B' each contained approximate binder solids of 50% acrylic latex; 50% liquid polysulfide dispersion. The following are the physical properties:

| Composition | A' | B' |
|---|---|---|
| Hardness, Shore A | 46 | 47 |
| Tensile, PSI | 167.1 | 224.5 |
| Elongation % | 320.9 | 343.8 |
| C-Tear lbs/in | 53.28 | 61.43 |

It can be seen that Compositions A' and B' exhibit significantly lower elongation.

EXAMPLE 2

A caulk formulation was prepared in which the binder solids were 39.8 percent acrylic latex, 32.9 percent liquid polysulfide, and 27.3 percent flaked hydrocarbon resin. A control was made up in a similar manner containing 54.8 percent acrylic latex and 45.2 percent polysulfide dispersion.

The caulk formulation was prepared by first preparing a dispersion/emulsion containing the following. (The composition as a whole contains 549.25 parts.)

|  | Parts |
| --- | --- |
| Rhoplex LC67 (acrylic latex) | 121.5 |
| Nevex 100 (70% hydrocarbon resin in mineral spirits) | 75 |
| Igepal 630 (surfactant) | .25 |
| Tamol 850 (surfactant) | 1.5 |
| Triton X405 (surfactant) | 3.5 |
| Ethylene glycol (freeze/thaw stabilizer) | 10 |
| Texanol (coalescent) | 3 |
| Foamaster VL (antifoaming agent) | 3 |
| ZW 2028 (52% polysulfide dispersion) | 39.5 |
| CaCO3 | 204.3 |

This was then let down in the following premix:

|  |  |
| --- | --- |
| ZW 2028 (52% polysulfide dispersion) | 82 |
| Foamaster VL (antifoaming agent) | 4 |
| NH4OH 28%, pH buffer | 0.8 |

After subsequent air dry/force dry curing techniques of 80 mils dry film thickness samples, physical properties of the formulations were:

| Hydrocarbon Containing Specimen | Control Specimen |
| --- | --- |
| Shore A | 35 | 41 |
| Elongation % | 305.8 | 138.5 |
| Tensile strength (psi) | 88.5 | 147.1 |
| C-tear lbs/in | 31.43 | — |

EXAMPLE 3

Barrier coatings were made up by first making a dispersion containing the following:

|  | A | B |
| --- | --- | --- |
|  | Parts by Weight | |
| LX 1200 (70% hydrocarbon resin in mineral spirits) | 71.5 | 0 |
| Nevex 100 (70% hydrocarbon resin in mineral spirits) | 71.5 | 107 |
| Igepal CO630 (surfactant) | 4.5 | 4.5 |
| Trycol NP-6 (surfactant) | 9 | 9 |
| Foamaster VL (antifoaming agent) | 1 | 1 |
| Water | 66 | 64 |
| Troysan 174 (a biocide) | 1 | 1 |
| Potassium Tripolyphosphate KTPP | 0.5 | 0.5 |
| KOH 2.5% solution in water | 20.0 | 16 |
| Ethylene Glycol (freeze/thaw stabilizer) | 12.5 | 12.5 |
| ASP 200 Clay (filler) | 100 | 100 |
| Deefo 1002 (defoamer) | 1 | 1 |
| QR 708 (thickener) | 5 | 5 |

The above ingredients are dispersed together; then additional KOH is used to adjust the pH to above 10.0 if necessary.

To this is added:

| Butonol NS 299 (styrene/butadiene latex) | 69.5 | 69.5 |
| --- | --- | --- |
| ZW 2028 (52% polysulfide dispersion) | 72 | 72 |
| TOTAL PARTS | 505 | 463.0 |
| lb/gal | 9.73 | 9.96 |
| pH | 10.7 | 10.0 |
| Viscosity (#5 spindle at 5 rpm (f = 800) | 32,400 cps | 40,800 cps |

A 50 mil wet film thickness drawdown was made on polyethylene sheet and allowed to cure for 2 weeks (14 days) at room temperature. A 20 mil dry film resulted with the following physical properties:

|  | A | B |
| --- | --- | --- |
| Tensile, PSI | 128.6 | 155.1 |
| Elongation, % | 809.8 | 761.4 |
| Hardness, Shore A | 40 | 38 |
| C-tear, Lbs/in | 25.51 | 35.55 |

COMPARATIVE EXAMPLE 3A

Composition C, similar to Compositions A and B of Example 3, was prepared, but without hydrocarbon resin. The composition contained approximate binder solids of 36% styrene butadiene latex; 64% polysulfide dispersion. The following are the physical properties of Composition C:

| Shore A hardness | 42 |
| --- | --- |
| Tensile, PSI | 61.74 |
| Elongation % | 42.95 |
| C-tear lbs/in | 24.79 |

It can be seen that Composition C exhibits substantially lower elongation than Compositions A and B.

While the invention has been described in terms of certain preferred embodiments, modifications obvious to one with ordinary skill in the art may be made without departing from the scope of the invention.

Various features of the invention are set forth in the following claims.

What is claimed is:

1. A binder composition comprising emulsified and-/or dispersed binder solid in an aqueous medium, said binder solids comprising:
   (A) between about 10 and about 70 wt. percent relative to total binder solids of a film-forming latex emulsion,
   (B) between about 10 and about 70 wt. percent relative to total binder solids of a non-film forming liquid polysulfide dispersion, said liquid polysulfide being —OH terminated and having a number average molecular weight of between about 100,000 and about 300,000, and
   (C) between about 10 and about 50 percent relative to total binder solids of emulsified hydrocarbon resin, said hydrocarbon resin having a Ring and Ball softening point of between about 60° C. and about 150° C. a number average molecular weight of between about 350 and about 1200 and an iodine number of between about 10 and about 70, said binder composition containing sufficient surfactant to maintain said binder solids emulsified and/or dispersed.

2. A binder composition according to claim 1 wherein said surfactant comprises between about 0.5 and about 2.5 wt. percent relative to said binder solids.

3. A binder composition according to claim 1 wherein said surfactant comprises nonyl phenol surfactant.

4. A binder composition according to claim 1 wherein said aqueous medium has a pH above about 8.

5. A composition comprising:
   I. Emulsified and dispersed binder solid comprising:
      (A) between about 10 and about 70 wt. percent relative to total binder solids of a film-forming latex emulsion, (B) between about 10 and about 70 wt. percent relative to total binder solids of a non-film forming liquid polysulfide dispersion, said liquid polysulfide being —OH terminated and having a number average molecular weight of between about 100,000 and about 300,000, and (C) between about 10 and about 50 percent relative to total binder solids of emulsified hydrocarbon resin, said hydrocarbon resin having a Ring and Ball softening point of between about 60° C. and about 150° C. a number average molecular weight of between about 350 and about 1200 and an iodine number of between about 10 and about 70, II. Surfactant sufficient to maintain said binder solids emulsified and/or dispersed, and III. Colored pigments and extender pigments at a pigment to binder solids ratio of bettween about 0.5 and about 3.

6. A composition according to claim 5 wherein said surfactant comprises between about 0.5 and about 2.5 wt. percent relative to said binder solids.

7. A composition according to claim 5 wherein said surfactant comprises nonyl phenol surfactant.

8. A composition according to claim 5 wherein said aqueous medium has a pH above about 8.

* * * * *